United States Patent [19]
Wang

[11] Patent Number: 6,072,175
[45] Date of Patent: Jun. 6, 2000

[54] MICROSCOPE USING MICRO-CHANNEL FILTER

[75] Inventor: Yu Wang, La Crescenta, Calif.

[73] Assignee: California Institute of Technology, Pasadena, Calif.

[21] Appl. No.: 09/198,072

[22] Filed: Nov. 23, 1998

[51] Int. Cl.[7] .................................. G01B 9/10; H01J 3/14
[52] U.S. Cl. .............................. 250/227.28; 250/227.29; 250/216; 250/227.11
[58] Field of Search .................... 250/227.28, 227.29, 250/208.1, 208.2, 216, 227.11, 227.2; 600/473, 476; 359/368

[56] References Cited

U.S. PATENT DOCUMENTS 4,634,857   1/1987   Fey .......................................... 250/227

*Primary Examiner*—Cassandra Spyrou
*Assistant Examiner*—Fayez Assaf
*Attorney, Agent, or Firm*—Fish & Richardson P.C.

[57] ABSTRACT

A microscope formed from an image sensor placed against a microchannel filter so that there is one to one correspondence between the sample and the sensor, effectively enlarging the image.

18 Claims, 3 Drawing Sheets

MICROSCOPE USING MICRO-CHANNEL FILTER

STATEMENT AS TO FEDERALLY SPONSORED RESEARCH

The invention described herein was made in the performance of work under NASA Contract No. 20218, and is subject to the provisions of Public Law 96-517 (35 USC 202) in which the Contractor has elected to retain title.

BACKGROUND

The basic structure of an optical microscope includes magnifying lenses and movement structure. The focus of the microscope is typically adjusted each time a sample is loaded. This is because the samples are typically slightly differently placed. This becomes extremely time-consuming, especially when there are a lot of samples. Moreover, the conventional microscope is relatively heavy because of its reliance on glass lenses, and specially-produced mechanical trays and moving devices.

SUMMARY OF THE INVENTION

In view of the above, it is an object of the present specification to provide a new design of microscope, which has a capability of being lighter weight than the conventional microscope. It is also an object to provide a system which obviates certain problems associated with focusing.

According to the preferred embodiment, solid state sensors are used for imaging the scene. The pixel size of current solid state sensors is already in the micron range which is close to the optical limit of a microscope. This raises the concept of making a one-on-one mapping from the sample to the pixel of the solid state sensor. This provides an electronic image that resolves at the level of pixel size.

BRIEF DESCRIPTION OF THE DRAWINGS

These and other aspects of the invention will now be described with reference to the attached drawings, in which.

DESCRIPTION OF THE PREFERRED EMBODIMENTS

When highly collimated light is incident on a sample, the light scatters. The scattered light spreads in all directions, while the unscattered light follows the original direction. An appropriate filter can be used to separate the scattered light from the unscattered light. A narrow angle filter allows only photons to travel along a desired direction, here the original direction, while absorbing the photons that travel along other directions. If such a filter is placed behind a sample, only the unscattered light passes through the filter. The rest of the light is absorbed.

Figure 1:
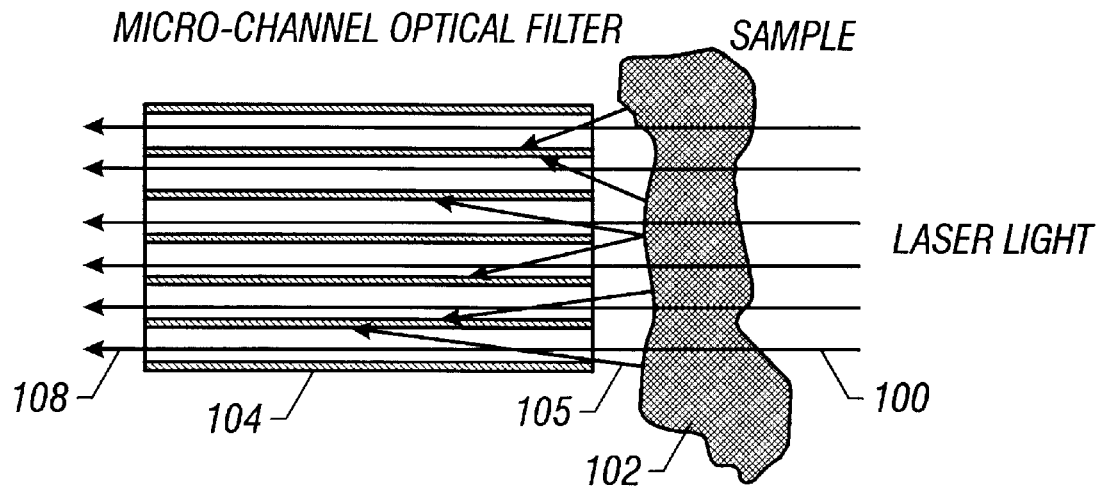
FIG. 1 shows a first embodiment of an optical microscope that uses one-on-one mapping between sample portions and a solid state sensor, for a transparent sample.

FIG. 1 shows a microscope formed using this concept. Highly collimated laser light 100 is passed to a sample 102. A micro-channel optical filter 104 is placed behind the sample 102 for this purpose. Scattered light such as 106 is absorbed by the micro-channel filter and not allowed to pass.

The non-scattered light such as 108, however, passes through the filter. The narrow angle filter in this embodiment, therefore, separates between the light which scattered and the light which did not scatter. The narrow angle filter is a filter which has straight, long, parallel holes. Photons travel along the wall of the channel unabsorbed.

The micro-channels are preferably in the one micron range, or matched to the resolution of the sensor 120 that is used. Each pixel of the sensor 120 is preferably matched to an opening of the micro-channel filter. This provides a one-on-one mapping from the sample to the detector pixels. The micro-channel filter is preferably a device with walls formed of material that absorbs light. The walls are made of dark glass, or formed of micromachined silicon.

Figure 2:
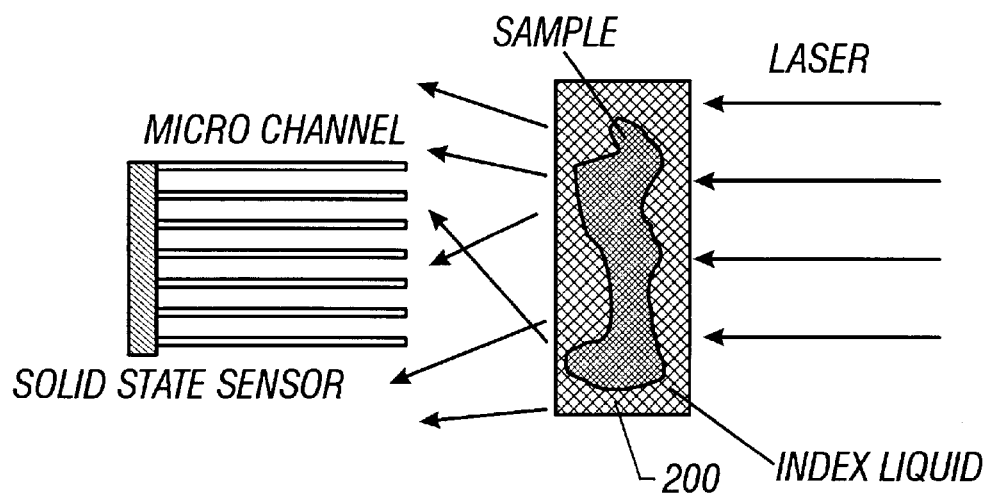
FIG. 2 shows a second embodiment in which the sample is immersed in a liquid.

The relatively small sensor usually produces an output that is indicative of a much larger scene. Hence, the image sensor 120 inherently magnifies the small item. The image sensor can be any conventional arrayed detecting device—an active pixel sensor, CCD, or the like. Another embodiment shown in FIG. 2 is similar to that shown in FIG. 1 additionally including the sample being in an optical fluid bath 200. The laser beam 100 shines on the optical fluid, which is preferably a liquid whose optical index is about the same as the index of the glass. Such optical liquids are often used for microscopes. The scattered light travels in all directions and is absorbed by the walls of the micro-channel filter. The unscattered light follows the original direction.

Both of these systems can operate a microscope without any image lens and without any movable focusing mechanism.

Figure 3:
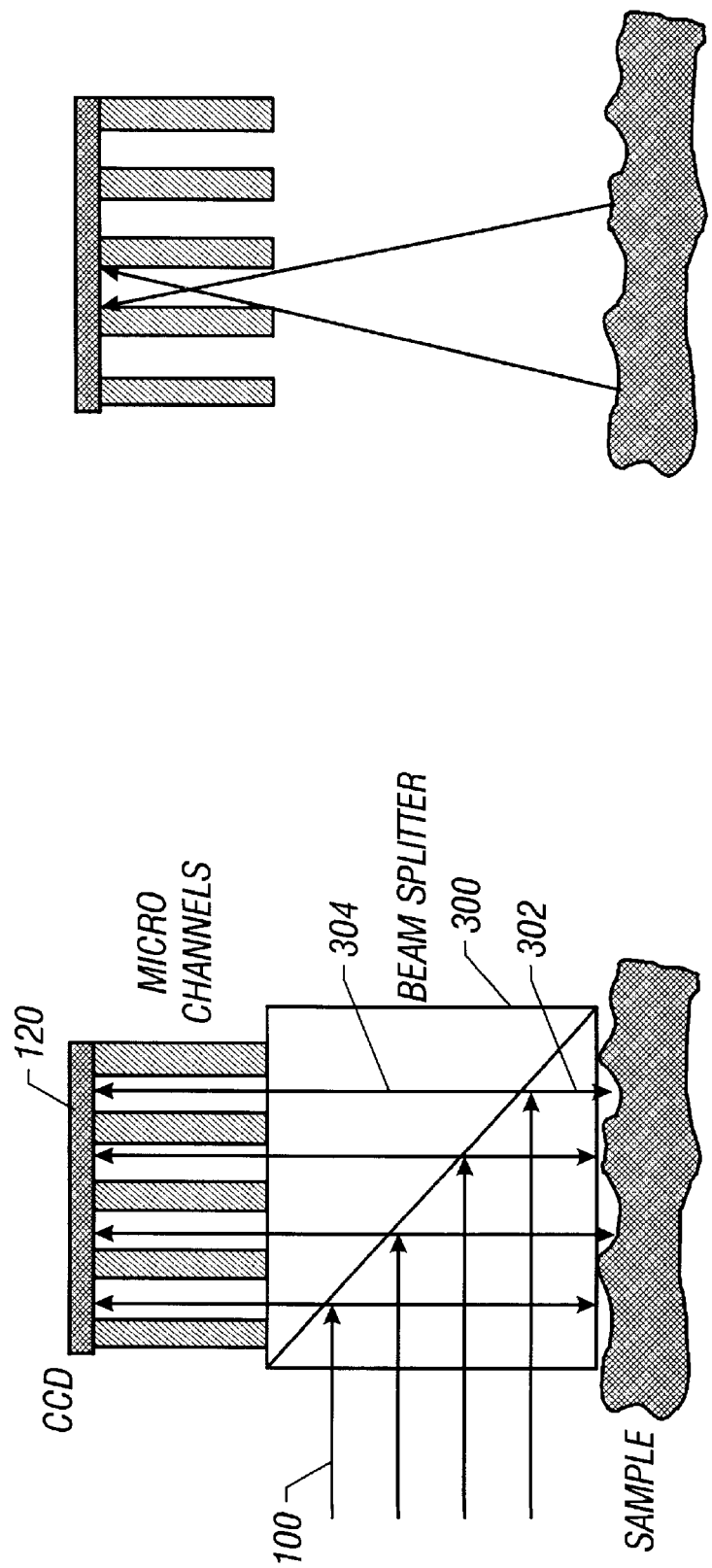
FIG. 3 shows a reflective microscope embodiment.

FIG. 3 shows an alternative embodiment. This is of a reflective microscope. The laser light 100 in this embodiment is input to a beam splitter 300. The beam splitter 300 reflects the light to the sample as reflected light 302. At least part of the light is reflected off of the sample, and reflected back to the micro-channels is shown as 304. That light, like the light shown in FIG. 1, is acquired by an image sensor 120, either a CCD or an active pixel sensor.

Figure 4B:
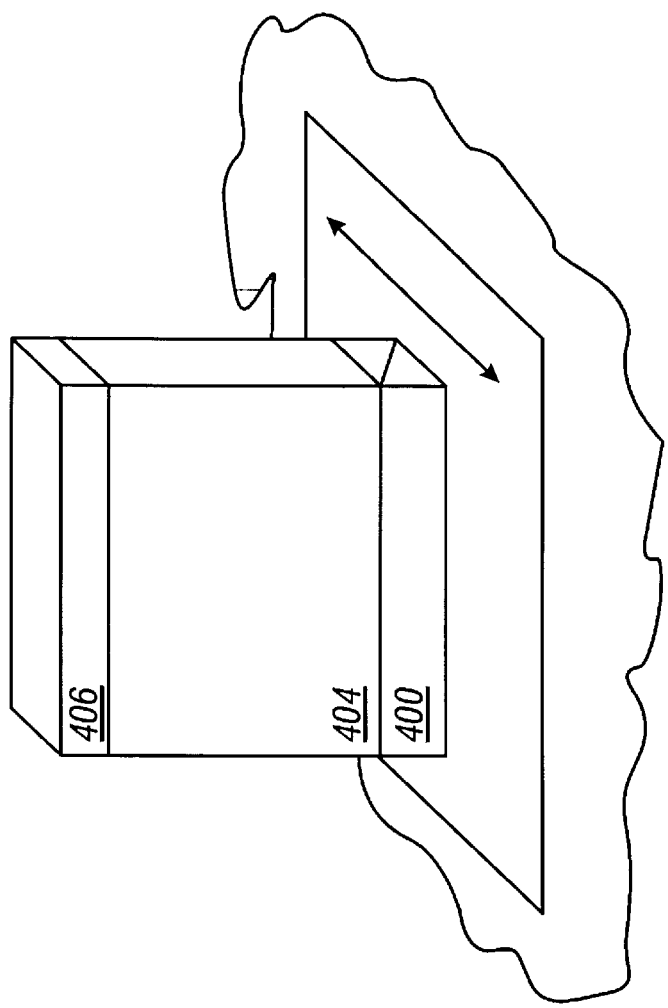
FIGS. 4A and 4B show a scanning reflective microscope on a chip embodiment.
Figure 4A:
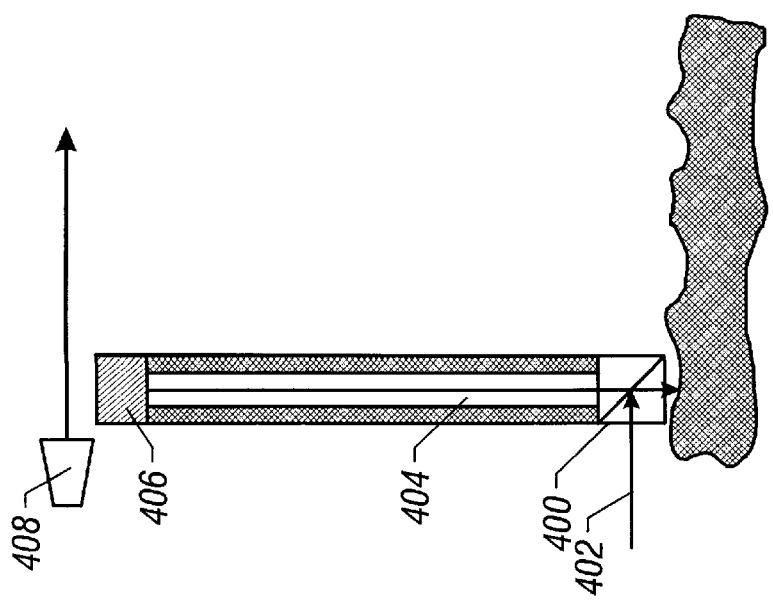

FIGS. 4A and 4B show yet another embodiment which includes a scanning reflective microscope assembly that is formed on a semiconductor chip. The device shown in FIG. 4A shows the device from the side. The beam splitter portion 400 is similar to that shown in FIG. 3. This enables the operation to be carried out using an alternative axial configuration and without need for a transparent sample or optical liquid. The device conceptually includes a beam splitter 400, a single source of laser light 402, the micro-channel device 404, and a single line sensor array 406. The device is also moved by a moving actuator 408 as shown.

A perspective view of the device is shown in FIG. 4B. The entire single line device is moved across the sample. By using the single dimensional linear array of micro-channels and sensors, the thickness of the beam splitter is reduced to pixel size, thereby reducing the weight and size. Since the beam splitter is smaller, it should be less expensive, and thereby a higher quality device can be used. This can reduce possible blurring.

The system as described herein teaches using a micro-channel optical filter as the device for detecting scattered light. This can be any system which defines a relatively straight path for the light, and which has walls that prevent scattered light from reaching the opposite end. The walls can be reflecting, or absorbing, so long as they prevent the light from reaching the opposite end.

Although only a few embodiments have been described in detail above, those of ordinary skill in the art will understand that modifications are possible without departing from the teaching noted above.

What is claimed is:

1. A solid state microscope, comprising:

a source of collimated light having plural pixels; and a solid state image sensor, configured to detect part, but not all, of said collimated light, each of said pixels receiving light from only one pixel area of a sample, said part of said collimated light which is detected indicative of some aspect of said sample, light received by said solid state image sensor hence representing said aspect of said sample.

2. A system as in claim 1 wherein said microscope operates without a lens between said collimated light, the sample, and the solid state image sensor.

3. A system as in claim 1 wherein said collimated light is laser light.

4. A system as in claim 1 further comprising a microchannel filter, between said sample and said sensor, said microchannel filter having light absorptive walls.

5. A solid state microscope, comprising:

a source of collimated light; and a solid state image sensor, configured to detect part, but not all, of said collimated light, said part of said collimated light which is detected indicative of some aspect of a sample, light received by said solid state image sensor hence representing said aspect of said sample; and a device which separates scattered light from unscattered light.

6. A system as in claim 5 wherein said device which separates scattered light from unscattered light is a microchannel filter.

7. A device as in claim 6 wherein said micro-channel filter comprises a plurality of channels, each approximately the size of a pixel of said image sensor, and each substantially aligned with one of said pixels of said image sensor.

8. A device as in claim 6 wherein said microchannel filter having light absorptive walls.

9. A method of acquiring a magnified image of a sample, comprising:

obtaining light which has been modified by passing through the sample; and coupling said light to a solid state image sensor such that each pixel of light is coupled to one of said pixels of said solid state image sensor, without a lens between said sample and said solid state image sensor, to thereby provide light to said solid state image sensor which is effectively magnified.

10. A method as in claim 9 wherein said coupling uses a filter with light absorptive walls.

11. A method of acquiring a magnified image of a sample, comprising:

obtaining light which has been modified in some way by the sample; and coupling said light to a solid state image sensor such that each pixel of light is coupled to one of said pixels of said solid state image sensor, without a lens between said sample and said solid state image sensor, to thereby provide light to said solid state image sensor which is effectively magnified;

wherein said acquiring comprises obtaining said reflected light of only unit in each pixel of said image sensor, each said unit being less than an entire image of the sample.

12. A method as in claim 11, wherein said acquiring comprises scanning one unit, and then scanning another unit.

13. A method as in claim 11 wherein said acquiring uses a light channeling element with light absorptive walls.

14. A solid state microscope, comprising:

a beam splitter having a first side and a second side, said first side being adjacent said sample and directing incoming light to said sample, and said second side being opposite said first side and receiving reflections from said sample;

a plurality of microchannels, located adjacent said second side to receive said reflections from said sample, and to pass said reflections within said microchannels; and an image sensor, having a plurality of pixels, each pixel arranged in one-to-one correspondence with at least a plurality of said microchannels.

15. A microscope as in claim 14, wherein said beam splitter has one dimension that is sized to obtain less than an entire row or column of pixels.

16. A microscope as in claim 14, wherein said beam splitter has one dimension that is sized to obtain a single row or single column of pixels.

17. A microscope as in claim 15, further comprising a moving element which scans said beam splitter to allow obtaining an entire image.

18. A microscope as in claim 14 wherein said microchannels have light absorptive walls.

* * * * *